United States Patent

Skold

[11] Patent Number: 6,083,887
[45] Date of Patent: Jul. 4, 2000

[54] METHOD FOR MECHANICAL WORKING

[76] Inventor: Rolf Skold, Dragonvagen 11, S-444 41, Stenungsund, Sweden

[21] Appl. No.: 09/101,156

[22] PCT Filed: Dec. 19, 1996

[86] PCT No.: PCT/SE96/01701

§ 371 Date: Oct. 28, 1998

§ 102(e) Date: Oct. 28, 1998

[87] PCT Pub. No.: WO97/25393

PCT Pub. Date: Jul. 17, 1997

[30] Foreign Application Priority Data

Jan. 5, 1996 [SE] Sweden ................................ 9600042

[51] Int. Cl.$^7$ ...................... C10M 129/00; C10M 125/00
[52] U.S. Cl. .......................... 508/154; 508/175; 508/179; 72/42
[58] Field of Search ...................................... 508/154, 175, 508/179; 72/42

[56] References Cited

U.S. PATENT DOCUMENTS

| | | | |
|---|---|---|---|
| 4,118,331 | 10/1978 | Jahnke | 508/508 |
| 4,475,938 | 10/1984 | Knoth | 65/334 |
| 4,770,780 | 9/1988 | Moses | 210/634 |
| 5,028,363 | 7/1991 | Nishio et al. | 264/28 |
| 5,050,532 | 9/1991 | Ruppert | 239/399 |
| 5,375,426 | 12/1994 | Burgener | 62/85 |
| 5,401,428 | 3/1995 | Kalota et al. | 72/42 |
| 5,616,544 | 4/1997 | Kalota et al. | 508/508 |

FOREIGN PATENT DOCUMENTS

| | | |
|---|---|---|
| 0523459 A2 | 1/1993 | European Pat. Off. . |
| 0546526 A1 | 6/1993 | European Pat. Off. . |
| WO 9003341 A1 | 4/1990 | WIPO . |
| WO 9216464 A1 | 1/1992 | WIPO . |

*Primary Examiner*—Jacqueline V. Howard
*Attorney, Agent, or Firm*—Birch, Stewart, Kolasch & Birch, LLP

[57] ABSTRACT

The present invention relates to a method for mechanical working of metal and other solid materials with a cooling and lubricating composition containing a major portion of carbon dioxide and a minor portion of a polar lubricant containing at least one polar organic compound with at least one oxygen atom. The polar groups may be selected from the group consisting of the ether, hydroxyl, carboxyl, ester and amido group or mixtures thereof.

8 Claims, No Drawings

METHOD FOR MECHANICAL WORKING

This application claims the benefit under 35 U.S.C. §371 of prior PCR International Application No. PCT/SE96/01701 which has an International filing date of Dec. 19, 1996 which designated the United States of America, the entire contents of which are hereby incorporated by reference.

The present invention relates to a method for mechanical working of metals and other solid materials as well as glass with a cooling and lubricating composition containing a major portion of carbon dioxide and a minor portion of a polar lubricant containing at least one polar organic compound with at least one oxygen atom.

The patent application WO 90/03341 and WO 92/16464 disclose the use of carbon dioxide in mechanical working processes as a cooling and lubricating medium. In the latter application it is suggested to add an additional lubricating agent to carbon dioxide to further improve the lubrication and reduce the heat generated during the mechanical working. The lubricant shall be soluble or dispersable in liquid carbon dioxide. The only specific lubricant additive mentioned in the patent specification is a spindle oil, Crucolan 7, based on hydrocarbons with low viscosity. Although the additions of spindle oils to carbon dioxide improves the total lubrication effect, the wear of the tool and the heat generated are unacceptable. A substantial improvment must be achieved to turn the carbon dioxide based cooling and lubrication composition commercially competetive with other lubrication systems.

Therefore, the main object of this invention is to find an additive which essentially improves the lubrication of the carbon dioxide. Another object is to select additives which are not toxic to human beings or the environment and do not easily decompose into harmful gases or aerosols.

It has now surprisingly been found that these objects can be met by performing the mechanical working of metal and other solid materials, such as ceramics and polymers, as well as glass in the presence of carbon dioxide in liquid form in mixture with a polar organic compound containing oxygen atoms as heteroatoms with a boiling temperature over 200° C. The amount of the polar organic compound added may vary within wide limits but is normally within the range of from 0.1 to 20, preferably from 0.5 to 4% by weight of the amount of carbon dioxide added. Preferably the organic compound has a boiling temperature above 250° C. and a melting point below 5° C., preferably below −5° C. The organic compound is soluble or dispersable in the liquid carbon dioxide and contains at least one polar group selected from the group consisting of the ether, hydroxyl, carboxyl, ester and amido group or mixtures thereof.

Suitable and prefered polar organic compounds are alcohols with a molecular weight of 130–280, preferably 140–200; carboxylic acids with molecular weights from 140–320, preferably 150–290; alkylethercarboxylic acids with molecular weights from 155–1000, preferably 170–600; polyols or ethers and esters thereof with molecular weights from 140–1000, preferably 140–800; esters of fatty acids or phosphoric acids with molecular weights from 155–400, preferably 165–350; and alkanolamides between monocarboxylic acids and alkanolamines or alkoxylates thereof, having molecular weights of 180 to 1000, preferably 230–700.

Suitable examples of useful organic compounds according to the present invention are those having the formula $R_1OH$, where $R_1$ is a branched or straight, saturated or unsaturated, aliphatic or acyl group with 9–18 carbon atoms such as branched alkyl groups having 9–15 carbon atoms or branched acyl groups. Other examples are ester compounds with the formula $R_2COOR_3$, where $R_2CO$ is an acyl group, preferably a branched or unsaturated acyl group with 10–20 carbon atoms, like oleyl and isostearyl, and $R_3$ is an alkyl group with 1–4 carbon atoms. Still another group of preferred organic compounds are those having the formula $R_4(A)_nOR_5$, where $R_4$ and $R_5$ are, independently of each other, hydrogen, an acyl group or an alkyl group with 1–20 carbon atoms, A is an oxyalkylene group with 2–4 carbon atoms and n is a number from 2–18. Preferably one or two of the groups $R_4$ and $R_5$ are hydrogen. Still another group of preferred organic compounds are those having the formula $R_6CON(X)R_7O(A)_nR_8$, where $R_6CO$ is an acyl group with 8–20 carbon atoms, preferably a branched or unsaturated acyl group, X is H or $R_7O(A)_nR_8$, in which $R_7$ is an alkylene group with 2–8 carbon atoms and A is an alkyleneoxy group with 2–4 carbon atoms, $R_8$ is hydrogen or an alkyl or acyl group with 1–6 carbon atoms and n is a number from 0–8. Further examples are alkylethercarboxylic acids having the formula $R_9O(A)_xCH_2COOH$, where $R_9$ is an alkyl group with 6–18 carbon atoms, A is an alkyleneoxy group with 2–4 carbon atoms and x is a number from 0–10.

In the process the polar compound may be introduced into the liquid carbon dioxide stream by means of for example a high pressure pump before the carbon dioxide is expanded and applied on the tool and/or the working area. The carbon dioxide is expanded from the liquid state to a gas normally within less than 10 seconds, preferably immediately before its application in order to obtain as good a cooling effect as possible. The polar compound may also be stored in a homogeneous liquid or dispersion together with the carbon dioxide under pressure. In this manner a constant ratio between the polar compound and the carbon dioxide can be ensured. In case the organic compound has a comparatively high melting point or a high viscosity it may be desired to heat it before mixing with carbon dioxide either in liquid form or with expanded carbon dioxide.

In a suitable embodiment the liquid mixture of the lubricant and the carbon dioxide is fed through internal channels within the working tool, like a drill, to the working area. The cross section area per channel can vary within wide limits but is normally from 0.01 to 1 mm$^2$, preferably from 0.02 to 0.2 mm$^2$.

In addition to the polar compound or the mixture of the polar compounds the lubricant may also contain an agent as a solubilizer and/or as an additional coolant component, which also may have certain lubricating properties. Examples of such agents are alkylene glycols, alcohols and ethers thereof with a molecular weigh of from 46 upto about 120 as well as water. The amounts of such an agent is normally from 0.1 to 100%, preferably 1–30% by weight of the polar compound or the mixture of polar compounds. In case water is present in the lubrication it is suitable to select at least one polar compound having anticorrosive properties into the lubricant.

The invention is further illustrated by the following working example.

EXAMPLE 1

Drilling tests were performed with a number of different lubricant additives in an amount of 2% by weight based on the amount of carbon dioxide. The carbon dioxide was added continously in an amount of 1.5 kg per hour to the drilling area. The lubricant additive was pumped into the stream of liquid carbon dioxide at room temperature and a pressure of 57 bars. The mixture obtained was then allowed to expand about 1 cm from the working area of the drill. The diameter of the drill was 6 mm, the drilled hole had a maximum depth of 6 mm, the feed speed was 0.17 mm/revolution at a periferal speed of the drill of 46 m/min or 40 m/min. Performance was evaluated in terms of number of holes possible to drill before drill failure. The following results were obtained.

| Test | Compound | No of holes |
|---|---|---|
| | At a periferal speed of 46 m/min | |
| 1 | Methyl oleate | 245 |
| 2 | Isobutyl oleate | 115 |
| 3 | Methyl cocoate | 87 |
| 4 | Dioctylester of adipic acid | 80 |
| 5 | Trimethylolpropane trioleat | 75 |
| 6 | Oleyl monoethanolamide + 2 EO | >350 |
| 7 | Coco fatty acid diethanolamide | 195 |
| 8 | Oleyl monoethanolamide + 4 EO | 334 |
| 9 | $C_{9-11}$-oxoalcohol | 169 |
| 10 | iso-stearic acid | 347 |
| 11 | Oleic acid | 89 |
| 12 | Polyethylene glycol, molecular weight 500 | >350 |
| 13 | Dioleate of polyethylene glycol (400) | 101 |
| 14 | Dipropylene glycol monomethyl ether | 341 |
| 15 | Triethylene glycol monomethyl ether | 229 |
| 16 | Oleyl phosphate | 71 |
| 17 | Cocodiethanolamine | 149 |
| 18 | Triethanolamine + 6 EO | 172 |
| 19 | $C_{9-11}$oxoalcohol + 4 EO | 155 |
| A | Only air | 33 |
| B | $CO_2$ | 33 |
| C | $CO_2$ + Crucolan 10 | 33 |
| | At a periferal speed of 40 m/min | |
| D | Only air | 39 |
| E | $CO_2$ | 92 |
| F | $CO_2$ + Crucolan 10 | 145 |
| G | Air + Methyl oleate | 86 |
| 20 | $CO_2$ + Methyl oleate | >350 |

From the results it is evident that the use of the polar compounds according to the invention in tests 1–20 improves the lubrication and the life of the drilling comparison with the control tests A–G.

What is claimed is:

1. A method for the mechanical working of metals, solid materials or glass in the presence of a mixture of a carbon dioxide and a lubricant, comprising:

(a) dissolving or dispersing the lubricant into the carbon dioxide to form a mixture;

(b) expanding the mixture; and (c) applying the mixture to the metals, solid materials or glass;

wherein the lubricant is soluble or dispersible in carbon dioxide, and wherein the lubricant contains at least one polar organic compound containing at least one oxygen atom, and wherein the lubricant has a boiling temperature of over 200° C.

2. A method according to claim 1, characterized in, that the polar organic compound contains a polar group selected from the group consisting of the ether, hydroxyl, carboxyl, ester and amido group or mixtures thereof.

3. A method according to claim 1, characterized in, that the organic compound has a boiling point over 250.

4. A method according to claim 1, characterized in, that the polar compound has a melting point less than 5° C.

5. A method according to claim 4, characterized in, that the melting point of the polar compound is less than 0° C.

6. A method according to claim 1, characterized in, that the polar compound is selected from the group consisting of an alcohol having a molecular weight of 130–280, carboxylic acid having a molecular weight of 150–320; a polyol or an ether or ester thereof with a molecular weight of 140–1000; an ester between a carboxylic acid and an alcohol with a molecular weight of 155–400; and an alkanolamide between a monocarboxylic acid and a monoalkanolamine or an alkoxylate thereof, having a molecular weight of 180–1000.

7. A method according to claim 1, characterized in, that said at least one polar organic compound is added in an amount of 0.1–20% by weight of the amount of carbon dioxide.

8. The method according to claim 7, wherein said at least one polar organic compound is added in an amount of 0.5–4% by weight of the amount of carbon dioxide.

* * * * *